// United States Patent [15] 3,672,076
Miller et al. [45] June 27, 1972

[54] SENSING SOLENOID GRADING SCHEME

[72] Inventors: Daniel D. Miller, Sunnyvale; Donald D. Miller, Saratoga; James M. Wrenn, Palo Alto, all of Calif.

[73] Assignee: Miller Scientific Corporation, Los Gatos, Calif.

[22] Filed: April 5, 1971

[21] Appl. No.: 131,092

Related U.S. Application Data

[63] Continuation-in-part of Ser. No. 831,025, June 6, 1969, abandoned.

[52] U.S. Cl. ....................35/48 B
[51] Int. Cl. ....................G09b
[58] Field of Search ....................35/48 R, 48 B

[56] References Cited

UNITED STATES PATENTS 3,401,472 9/1968 Lord....................35/48 B
3,410,990 11/1968 Flaherty....................35/48 B
3,145,485 8/1964 Petroff et al....................35/48 B

*Primary Examiner*—Robert W. Michell
*Assistant Examiner*—J. H. Wolff
*Attorney*—Roger S. Borovoy

[57] ABSTRACT

Apparatus for scoring multiple choice examinations recorded on answer cards having answers indicated thereupon by means of conventional pencil marks. As used herein, the term "multiple choice" includes any situation where the student chooses between more than one possible answer, such as "true" or "-false," "a," "b," or "c," etc. The answer card and the master card are held in registration and placed into the apparatus where photocells detect the presence or absence of ordinary pencil marks in the answer card which are disposed in locations relative to the master card denoting correct answers. An electrical output signal is given in the event of a wrong answer and a mark is automatically made on the answer card indicating the error.

1 Claim, 5 Drawing Figures

INVENTORS
DANIEL D. MILLER
DONALD D. MILLER
JAMES M. WRENN
ATTORNEY

INVENTORS
DANIEL D. MILLER
DONALD D. MILLER
JAMES M. WRENN

ATTORNEY

SENSING SOLENOID GRADING SCHEME

CROSS-REFERENCE TO RELATED APPLICATION

This application is a continuation-in-part of patent application Ser. No. 831,025 filed June 6, 1969, now abandoned.

FIELD OF THE INVENTION

This invention relates to a simple automatic scoring apparatus, or "grading machine" for multiple choice examinations wherein the answers are recorded on answer cards. The answer card is compared with the master card in the apparatus to determine the correct and incorrect answers, and to mark the incorrect ones.

PRIOR ART

Grading machines are not new. Conventionally, answers are recorded either by punching holes in an answer card and reading the card by electrical "feelers" or by photoelectric means; or in the alternative, having the answers recorded on the card in pencil having special machine-readable magnetic or conductive properties. The magnetic properties are detected by magnetic sensors as the card is passed through the grading machine; the electro-conductive pencil marks complete an electric circuit between two metal feelers.

Obviously it would be very useful to have one or more such grading machines in every classroom in the world. All of these machines, however, are all quite complicated and expensive, and hence have not received such wide distribution.

SUMMARY OF THE INVENTION

The present invention accomplishes the same result as prior art grading machines, but with a simplified structure using a unique and unobvious sensing technique. It was previously believed that it would not be possible to sense the presence or absence of a pencil mark through a hole in a master card without the pencil having special properties (i.e., magnetic or electro-conductive). Unexpectedly, the machine of this invention was discovered which senses the relative opacity between a portion of a conventional "IBM" type data processing card having a mark made with conventional pencil lead, crayon, or other relatively opaque marker, and another portion not having such a mark.

Briefly the apparatus of this invention for scoring multiple choice examinations recorded on answer cards having answers indicated thereupon by means of conventional marks, without any special magnetic or other properties, includes:

a means for holding an answer card disposed in registration over the master card, the master card having openings disposed to expose each mark in a location on the answer card for a correct answer, the remainder of the master card covering any marks on the answer card which are in incorrect locations;

one or more photocells in registration with one or more corresponding sources of light and also with each possible correct choice on any single answer on the answer card, each of the photocells adapted, when in registration with an opening in the master card, to provide one electrical output signal if a mark on the answer card is in registration with the opening, and a different electrical output signal if a portion of the answer card having no mark is in such registration; and a means for passing the pair of registered master and answer cards between the photocells and the sources of light.

The invention also includes a method of holding the master card in registration with an answer card and passing the registered cards in a tray between a plurality of light sources and aligned photocells in order to obtain one electrical signal if a mark in the answer card is in registration with an opening in the master card, and a different electrical signal if it is not. In a preferred embodiment of the invention, an error mark is automatically made on the answer card in the event that an answer mark is in an incorrect location.

DETAILED DESCRIPTION

Figures 1, 4:
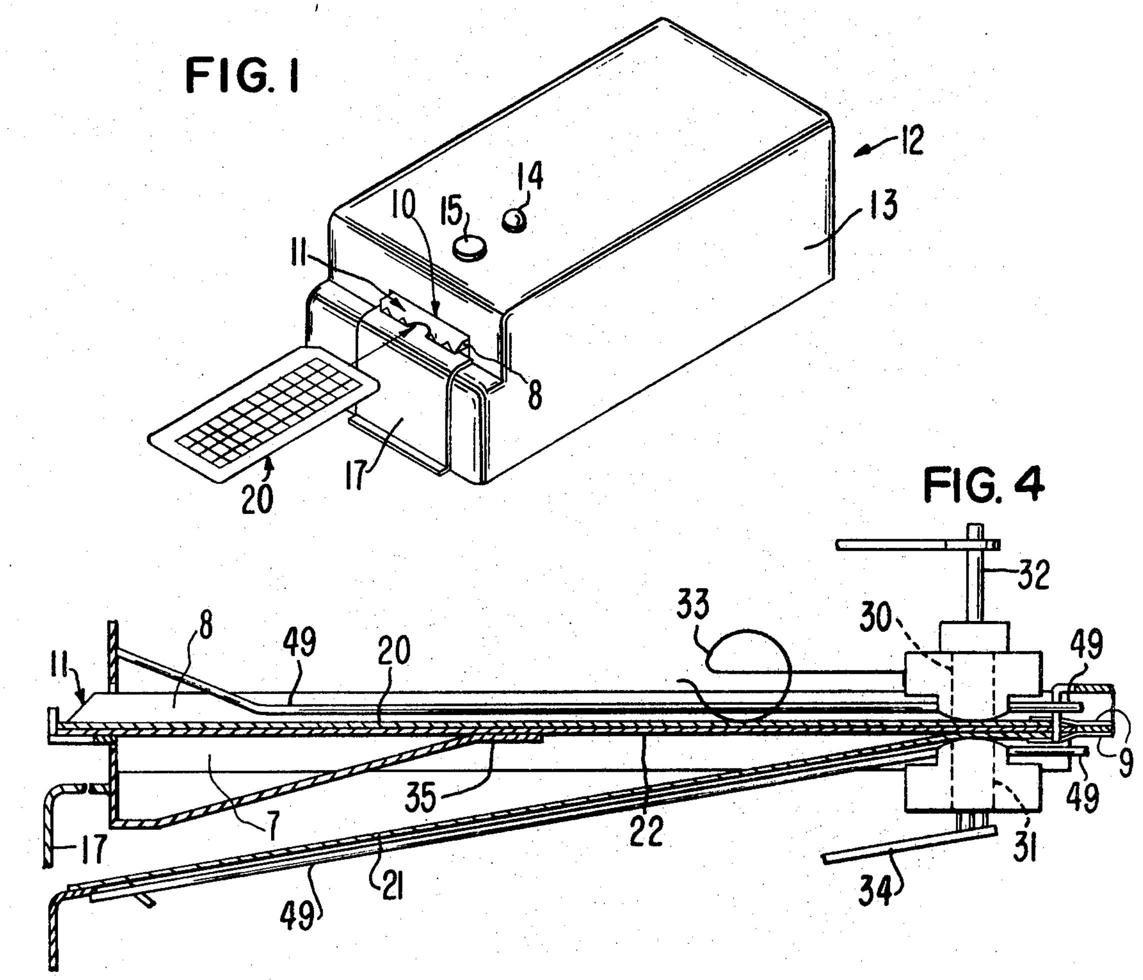
FIG. 1 is a pictorial view of the apparatus of the invention.
FIG. 4 is a side, cross-sectional view of the card handling apparatus of the invention, showing the photocell and light mechanisms.

Referring to FIG. 1, the machine 12 of the invention is illustrated. An answer card 20 to be graded is placed into tray 11 which normally rests primarily within the machine 12. As will be described in more detail later, the answer card is aligned with a master card within tray 11, the master card normally remaining within the machine 12. The master card was put into the machine previously by the teacher so that it is not accessible to the student. Only the teacher, by the use of a key, can remove the master card from the machine by removing master card cover 17. The machine has a cover 13 which leaves exposed a pilot light 14 and an actuator button 15. When the answer card 20 is placed into tray 11 and is aligned with the master card, button 15 is depressed to begin the operation of the motor in order to move the tray towards the right and to pass the aligned master and answer cards by the photocells 31. The answer card is then graded and tray 11 returns to the same position shown in FIG.

Figure 5:
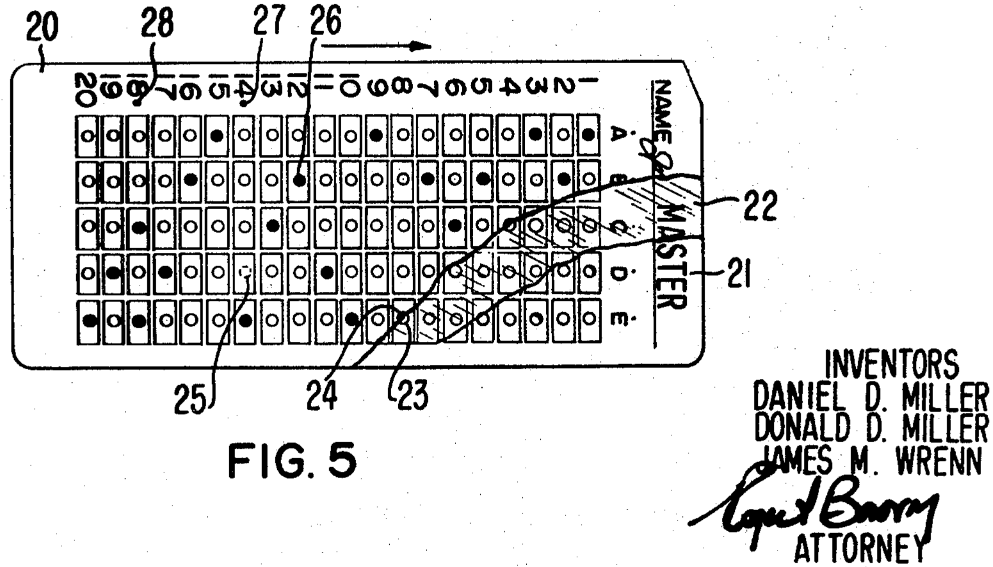
FIG. 5 is a partially broken-away view showing a typical master and answer card in registration.

At this point, a brief description of the cards themselves is helpful. Referring to FIG. 5, an answer card 20 is shown. This card has 20 rows, numbered one through 20, as shown, and five columns, labeled A through E, denoting the five choices the student has for the correct multiple choice answer. He fills in with a conventional lead pencil the indicated circle in one of the columns denoted by the letters A through E he believes to correspond to the correct multiple choice answer to each of the 20 questions.

Before the card 20 is placed into the machine, the teacher in most cases must make sure that the student has not marked more than one circle in any one row. For example, should she observe, as is shown in row 18, that the student filled in two dots, she should mark that row with an error indication, such as the dot 28 at the left-hand end of row 18, as shown. The master card 21, having notations for rows and columns corresponding to answer card 20, is placed beneath the answer card 20. If desired, a transparent sheet 22 may be placed between the master and answer card, although it is not required.

It is possible, however, for the teacher to word the question so that more than one choice must be marked. In that event, two or more holes will appear in a single row of the master card. The student must put in a mark corresponding to each hole or his answer will be marked as wrong.

Figure 3:
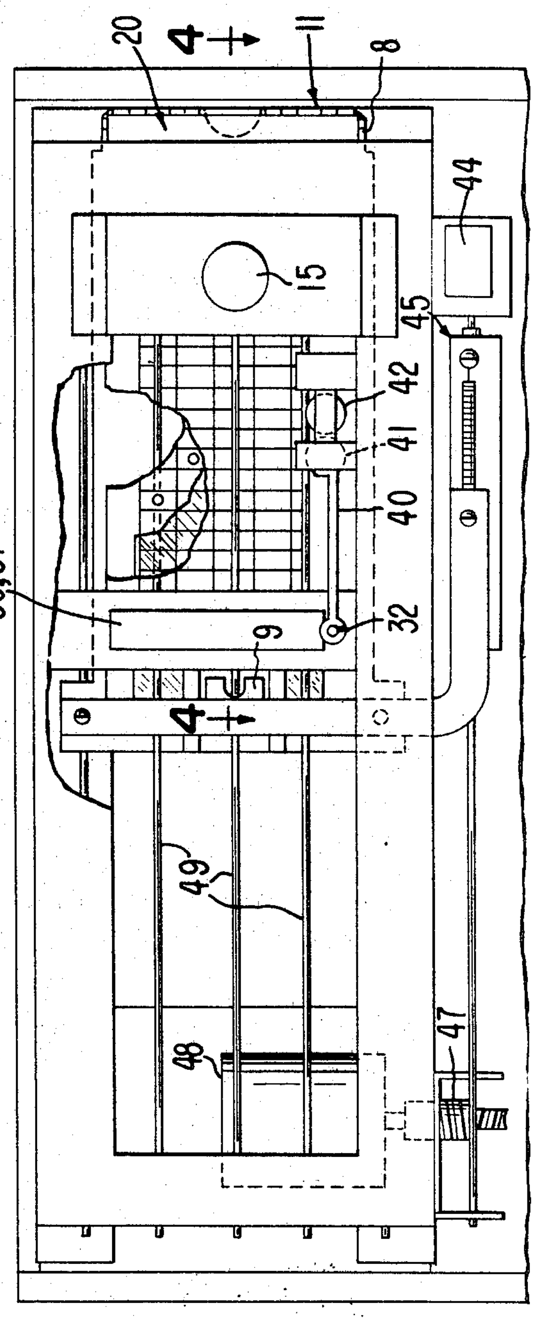
FIG. 3 is a top view, with the cover removed, partially broken away, showing the details of the card-handling apparatus.

Referring collectively to FIGS. 1, 3, and 4, answer card 20 to be graded is slid into the machine through slot 10 onto tray 11. Master card 21 is already disposed in the machine atop guide rods 49 and behind cover 17, as best seen in FIG. 4. The alignment of master card 21 and answer card 20 within the machine are quite important. This alignment is achieved by double clip 9, shown in FIGS. 3 and 4, which tightly holds the right-hand ends of master card 21 and answer card 20 (and the sheet 22 in between) to insure alignment.

Additional insurance of the alignment of the two cards is achieved by alignment means, or side rails 7 and 8. Side rail 8 is shown in FIGS. 1, 2, 3 and 4, and side rail 7 is shown in FIG. 4. Side rail 8 prevents answer card 20 from moving to side to side within tray 11, and side rail 7 prevents master card 21 from moving from side to side on guide rails 49.

The operation of the machine begins by depressing of button 15. At that time, tray 11, shown in FIG. 4, moves rightward beneath photocells 31 and registered light sources 30. In the preferred embodiment illustrated, there are five light sources and five corresponding photocells opposite the light sources and in registration therewith (there being five possible correct positions on a card). Thus there is one light source in line with each possible correct position of a mark. Each of the photocells 31 is adapted, when in registration with an opening 23 (FIG. 5) in master card 21, to provide an electrical output signal if a mark, such as mark 24, is present. However, if, as in a row fourteen, there is an opening 25 in master card 21 with no mark in the corresponding circle of the answer card 20, a different electrical output signal will be provided from the photocell, indicating a wrong answer. Thus, the photocells 31 and light sources 30 are able to detect the difference in relative opacity between a hole in the master card 21 in registration with a blank in the answer card 20, as shown in FIG. 5 by reference numerals 25, and a hole in the master card 21 registered with a mark on answer card 20, as shown in FIG. 5 by reference numerals 26.

Circuit board 34 contains the appropriate electrical circuitry to properly operate the photocells 31 and associated lights 30. Photocells 31 are conventional photodiodes which provide one output voltage level when the photocell and its associated light source are in registration with a hole in the master card corresponding to a blacked-out or marked portion of the answer card, and another different output voltage level because of the increased incident light upon the diode when they are in registration with a hole in the master card which is not aligned with a marked portion of the answer card. This different voltage level provides an error signal. The use of photocells in this manner and the electrical circuitry for connecting them is conventional and need not be described here further. The output terminals of the photodiodes 31 are connected through appropriate wiring so that an error signal energizes the power supply to the pen 32 causing that pen to make an error mark.

In that event the electrical output signal from one of photocells 31 energizes pen 32, shown in FIG. 4 to automatically make a mark, such as mark 27, along the row of the card which is in registration with the photocell 31 and the corresponding light source 30 at the time the electrical error output signal is provided. Thus, the output signal provided by the absence of a pencil mark in the answer card 20 in registration with hole 25 results in pen 32 making mark 27 in row fourteen, as shown in FIG. 5.

In the preferred embodiment illustrated, the master card 21 is locked in the machine. The master card 21 can only be removed by the teacher first unlocking and removing cover 17, thus preventing the student from having access to master cards. After the answer card 20 is graded, tray 11 returns to the position shown in FIG. 1 and the answer card 20 may be removed through entrance slot 10. On the beginning of the return trip of tray 11 to the position shown in FIG. 1, both master and answer cards move toward slot 10. However, spring 33 pushes downwardly on both cards. Separating means 22 is permanently held in tray 7 and prevents answer card 20 from moving below divider 35 on the return trip of tray 11. The pushing of master card 21 below card divider 35 assures, on the return trip of tray 11, that master card 21 slides below divider 35 and remains hidden by cover 17. Answer card 20 remains above held up by the tray 11 and separating means 22 on which it rides, as shown in FIG. 4.

Alternatively, the teacher may remove the door 17 and place the master card in the slot behind the door 17; or the student may place the master card and the answer card together, as shown in FIG. 5, into slot 10.

Figure 2:
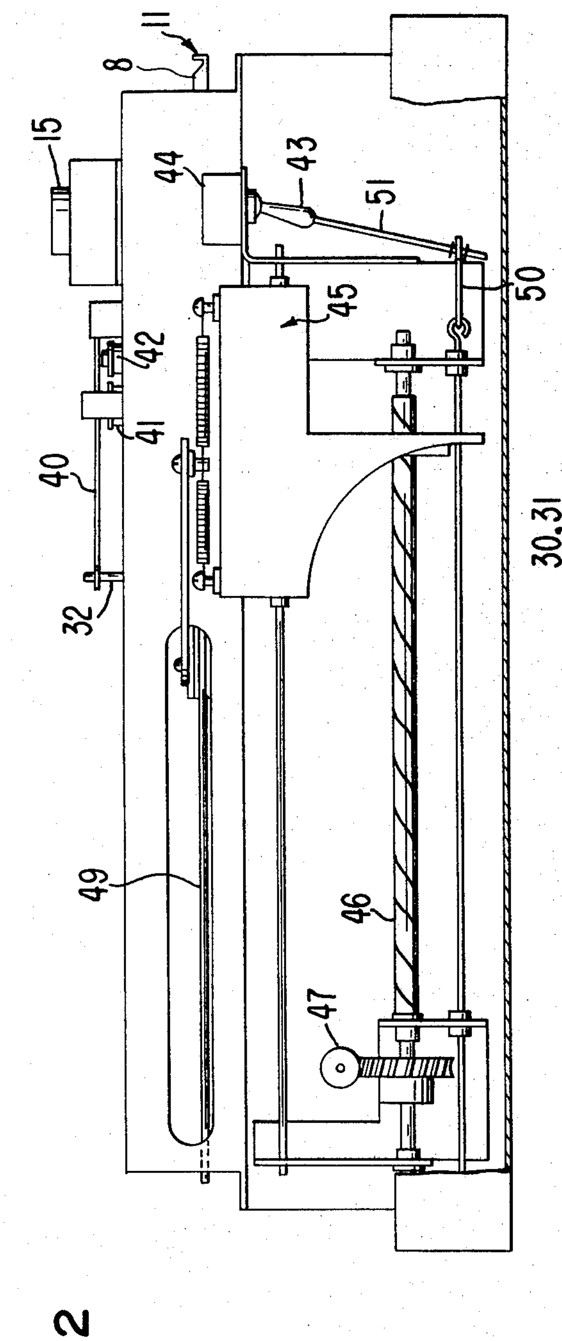
FIG. 2 is a side view, partially broken away, with the cover removed, showing the details of the card-handling apparatus.

FIG. 2 shows a more detailed view of the apparatus of the invention. Pen 32 is attached to the end of hammer 40 of a conventional doorbell which has had its bell portion removed. The hammer is actuated by a pair of magnets 41 and 42, as is conventionally the case with a doorbell. It has been unexpectedly found that a doorbell provides a very rapid reciprocating action of pen 32 so that a card containing, for example, twenty lines of answers can be graded completely in a few seconds. It was found that normal, general purpose solenoids will not provide this action. Each time the error output signal from the photocells 31 is generated, the hammer 40 forces pen 32 against the answer card 20, marking a wrong answer as shown in FIG. 5 by reference numerals 27.

A single depression of button 15 serves to move an ungraded answer card 20 on tray 11 through the machine and to remove the completely graded answer card on tray 11 back to slot 10, as discussed above. To accomplish this, after the answer card 20 registered with master card 21 on tray 11 has passed completely into the machine and has been graded, toggle 43 of reversing switch 44 is automatically thrown by the action of lever 51 attached to rod 50. Rod 50 is actuated at the end of the forward travel of slider 45 attached to tray 11 so as to reverse the motor and the direction of travel of slider 45 and tray 11 to send the answer card 30 back to slot 10. Card support slider 45 is pulled by twisted shaft 46, using a worm gear drive 47 (shown in FIG. 3) driven by motor 48. Shaft 46 is made by twisting a flat ribbon. It passes through a slot in slider 45 so that its screwing action causes slider 45 to move forward or backward. Guide rods 49 are used to guide the cards through the machine. The lamps and photocells 30, 31 are shown in a top view in FIG. 3.

As can be readily seen, the apparatus may be modified by eliminating the locked-in master card. In this event, the three guide rods 49 below the master card are no longer necessary. Both cards are then inserted together by the student into clip 9, and answer card graded, and both cards returned to the entrance slot 10.

What is claimed is:

1. Apparatus for scoring multiple choice examinations recorded on answer cards having answers indicated thereupon by means of conventional marks without any special magnetic or other properties, comprising:

a means (9) for holding an answer card (20) disposed in registration over a master card (21), said master card (21) having openings (23) disposed to expose each said mark in a location on the answer card (20) for a correct answer, the remainder of said master card (21) covering any of said marks on the answer card which are in incorrect locations;

scoring means, including one or more photocells (31) and one or more corresponding sources (30) of light in registration with said photocells and also with each possible correct choice on any single answer on said answer card (20), each of said photocells (31) adapted, in conjunction with appropriate conventional electric circuitry (34), when in registration with an opening in the master card (21), to provide one electrical signal if a mark on the answer card is in registration with said opening, and a different electrical signal if a portion of the answer card having no mark is in such registration;

marking means (32) electrically coupled to said scoring means, for electrically placing an error mark on said answer card (20) in the event that the electrical signal received by said marking means from said scoring means is indicative of a mark on said answer card (20) in registration with an opening in said master card (21);

a sliding tray means (11) for passing the adjacent pair of registered master (21) and answer (20) cards between said photocells (31) and said sources of light (30);

an entrance slot (10);

a separating means (22) between said answer (20) and master (21) cards adapted to keep said cards apart and to ease further separation after scoring;

alignment means (7, 8) holding the cards in registration adjacent to each other;

a spring (33) adapted to push both of said cards together in a perpendicular direction, the card (21) away from said spring moving a greater distance in the direction pushed than the card (20) closer to said spring causing further separation of the cards during return of tray (11) towards the entrance slot (10), said answer card (20) being held in place by said separating means (22); and a divider (35) adapted to come between said cards when they are thus further separated by said spring (33) to retain the master card (21) in the apparatus while maintaining the answer card (20) on said tray (11) as said tray (11) moves towards said entrance slot (10).

* * * * *